US006718310B1

(12) United States Patent
Fuisz et al.

(10) Patent No.: US 6,718,310 B1
(45) Date of Patent: Apr. 6, 2004

(54) METHODS FOR DETERMINING CUSTOMER MOTIVATIONS IN PURCHASING DECISIONS

(75) Inventors: Richard C. Fuisz, McLean, VA (US); Joseph M. Fuisz, Arlington, VA (US)

(73) Assignee: Rxdrugstore.com Limited, Chantilly, VA (US)

( * ) Notice: Subject to any disclaimer, the term of this patent is extended or adjusted under 35 U.S.C. 154(b) by 0 days.

(21) Appl. No.: 09/351,143

(22) Filed: Jul. 12, 1999

(51) Int. Cl.⁷ .............................................. G06F 17/60
(52) U.S. Cl. ............................ 705/26; 705/10; 705/27; 705/28
(58) Field of Search ........................... 705/10, 22, 28, 705/26–27; G06F 17/60

(56) References Cited

U.S. PATENT DOCUMENTS

| | | | | |
|---|---|---|---|---|
| 3,655,953 A | * | 4/1972 | Gubelmann et al. | 235/137 |
| 5,383,111 A | * | 1/1995 | Homma et al. | 705/27 |
| 5,495,412 A | * | 2/1996 | Thiessen | 705/1 |
| 5,924,080 A | * | 7/1999 | Johnson | |

FOREIGN PATENT DOCUMENTS

| | | | | |
|---|---|---|---|---|
| JP | 2-66482 | * | 3/1990 | G06F/17/60 |
| JP | 7-237083 | * | 9/1995 | H04M/15/00 |
| JP | 2000-099101 | * | 3/2000 | G06F/17/60 |

OTHER PUBLICATIONS

Patent & Trademark Office, Examination Guidelines for Computer–Related Inventions—Final Version, published on Feb. 27, 1996.*

Amazon.com, Amazon.com Buying Information.., total 23 pages, copyrighted 1996–2002.*

See the attachment for a continuation sheet.*

* cited by examiner

Primary Examiner—Cuong Nguyen
(74) Attorney, Agent, or Firm—McDermott, Will & Emery (57) ABSTRACT

Methods provide for auditing of on-line commercial transactions to determine what products are the primary motivations for a customer to begin an on-line shopping session. When a purchase is made during a shopping session, the method determines whether a purchased product is related to a previous "prime motivator" product. If so, the product is designated as a derivative product and a derivative count associated with the product is incremented. If not, the product itself is designated a prime motivator product and a prime motivator count associated with the product is incremented. The method may be repeated for every purchase fielded by an on-line commercial site.

22 Claims, 6 Drawing Sheets

METHODS FOR DETERMINING CUSTOMER MOTIVATIONS IN PURCHASING DECISIONS

BACKGROUND OF THE INVENTION

The present invention relates to a system and method for identifying motivations in purchasing decisions by consumers.

In retail sale stores, a great deal of time and effort is directed to the task of physical layout. Many product placement decisions are made based upon estimates of consumer behavior in an effort to place products in a location that maximizes the likelihood that they will be observed and purchased by a customer. Consider the example of a retail pharmacy, for example. In many pharmacies, prescription medicines are dispensed in the rear of the pharmacies' physical plant. This physical layout is not accidental; the layout is premised on an assumption that customers enter pharmacies in order to purchase prescription medicines. By dispensing prescription medicines in the rear of the pharmacies' physical plant, the pharmacy requires customers to pass through the interior of the store where they may observe other products offered by the store. In theory, it raises the probability that the customers will make impulse purchases of other items. This arrangement is predicated on an assumption that customers enter pharmacies to buy prescription medicines.

It is a difficult and expensive task to determine how consumers decide to buy particular goods or services ("products"). Retailers spend great sums of money commissioning studies and other investigations to determine why a customer entered a particular store or why the customer determined to purchase particular products. Some consider surveys of customers to be unreliable. The mere fact that a customer is questioned about his buying habits tends to skew the survey results because, by questioning the customer directly, the customer ceases to think intuitively. Instead, the customer may over-think a purchasing decision. Additionally, only a small sample of the buying public may be surveyed with reasonable cost. There can be no guarantee that the survey will accurately reflect the buying decisions of the public at large particularly when buying decisions reflect impulsive behavior.

Other methods for measuring and evaluation customer behavior are known. Typically, they require some type of customer surveillance to monitor purchasing decisions as they are made. However, such surveillance is expensive, time-consuming and cannot be done on a large scale. Thus, the same problem of undersampling arises when customer surveillance is performed.

There is a need in the art for a system that can identify customer motivations from customer purchasing decisions. Further, there is a need in the art for a system that can identify customer motivations using a large statistical base at low cost.

SUMMARY

Embodiments of the present invention provide for auditing of on-line commercial transactions to determine what products are the primary motivations for a customer to begin an on-line shopping session. When a purchase is made during a shopping session, the method determines whether a purchased product is related to a previous "prime motivator" product. If so, the product is designated as a derivative product and a derivative count associated with the product is incremented. If not, the product itself is designated a prime motivator product and a prime motivator count associated with the product is incremented. The method may be repeated for every purchase fielded by an on-line commercial site.

DETAILED DESCRIPTION

Embodiments of the present invention provide a system for identifying and measuring customer motivations in purchasing environments. The system monitors customers as they select goods or services (collectively, "products") for purchase. Of the products that are selected, the system identifies those products that are prime motivators, those products that are related to the customer's motivation to enter the on-line store. The system also identifies other products that are secondary motivators, products that the customer purchases as ancillary to the prime motive products.

According to an embodiment of the present invention, a computer system that engages in traditional on-line commerce also monitors purchases made by on-line customers to identify "prime motivator products," those products that caused the customers to initiate a shopping session. The system also identifies "derivative products," those products that are purchased during a shopping session that, most likely, are not products that caused a customer to initiate a purchasing session. According to an embodiment of the invention, prime motivator products and derivative products may be logged during every shopping session handled by an on-line commerce system. Thus, the present invention builds a database of information that possesses much more statistical validity at lower expense than any monitoring system known in the art.

Figure 1:
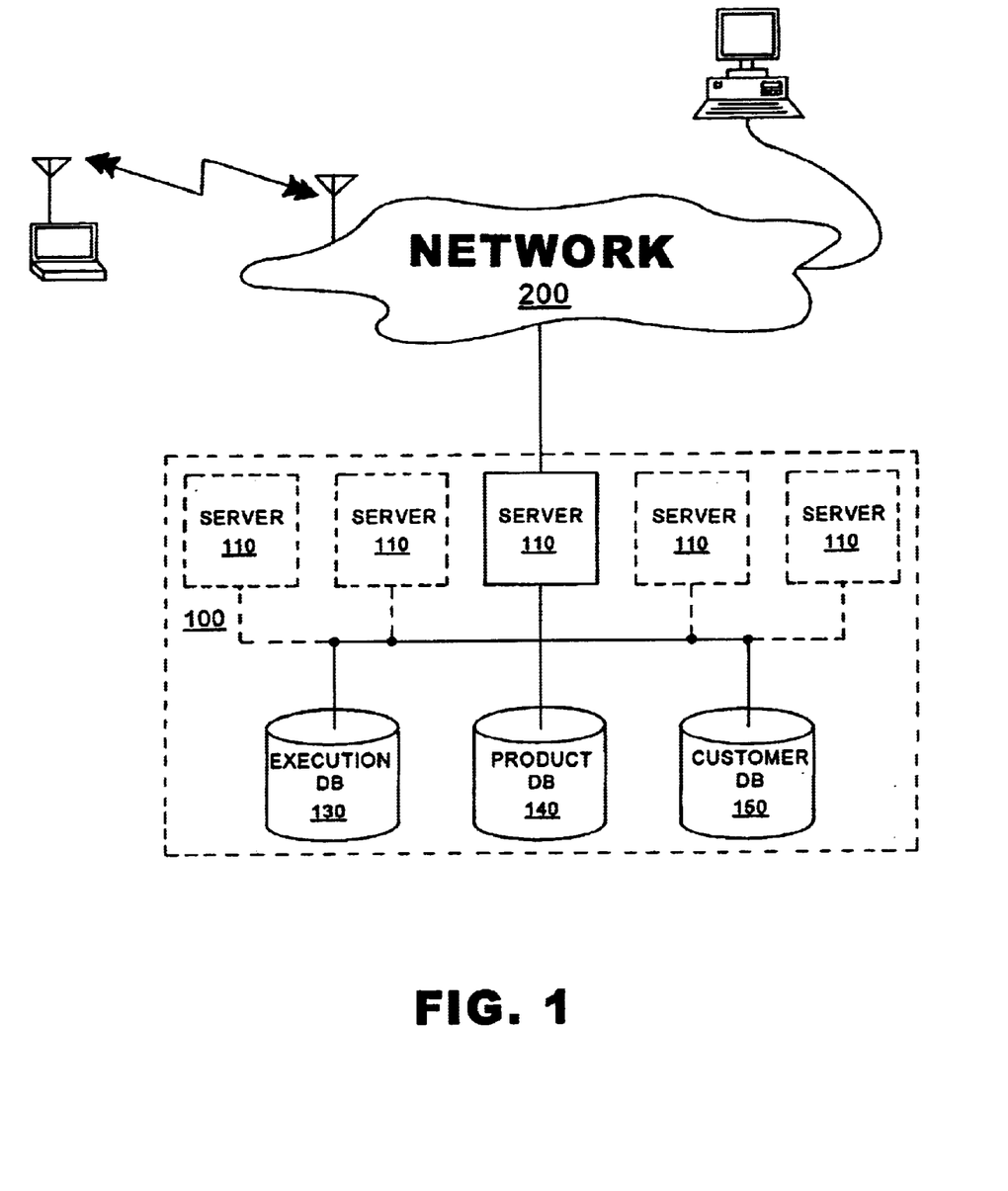
FIG. 1 is a block diagram illustrating an on-line site according to an embodiment of the present invention.

FIG. 1 illustrates an exemplary on-line commercial system ("on-line site") constructed in accordance with the present invention. On-line sites 100 are known per se. They typically include one or more servers 110 provided in communication with a computer network 200, such as a wide area network or an Internet. Where more than one server 110 is provided, the servers 110 may communicate with the network 200 via communications equipment such as a gateway (not shown). The on-line site 100 also may include a variety of databases 130–150. A first execution database 130 stores executable program instructions to be performed by the servers 110. A product database 140 stores information content related to the products to be offered by the on-line site 100. Optionally, as will be discussed herein, the on-line site 100 may include a customer database 150.

The on-line site 100 typically is adapted to communicate with client terminals 10, 20 via the computer network. Both the on-line site 100 and the client terminals 10, 20 may be provided with network addresses by which they may interexchange data using the network 200 as transport medium. A variety of computer networks 200 are available for use with the present invention; they vary in number, type and communication protocols used. The on-line site 100 and methods described herein may be adapted for use with any of them.

Typically, the execution database 130 includes program instructions that permit the servers 110 to carry out operation consistent with an on-line commercial enterprise. Thus, the execution database 130 will include program instructions that permit the on-line site to receive data requests from customers at client terminals 10, 20, retrieve product information in response to such data requests, forward product information to client terminals, receive purchase requests from the client terminals and execute purchase requests when made. Typically, the program instructions may cause a server 110 to assign a session identifier to individual customers (via their client terminals 10, 20) and conduct independent shopping sessions with each. Thus, a server 110 may execute the program instructions from database 130 during a first shopping session with a customer at client terminal 10 and may execute the same program instructions independently during a second shopping session with a second customer at the same or different client terminal 10 or 20. The ability for on-line sites to engage with multiple client terminals simultaneously and independently is a known feature of such sites.

The product database 140 includes information regarding the various products offered by the on-line site. The content of such product databases 140 varies in accordance with the application for which the on-line site 100 may be used. Typically, however, the product database is indexed by a product identifier. For each product offered by the on-line site, the product database 140 may store, in separate database fields, such information as: product descriptions, product price, number currently in inventory, pointers to other products offered by the on-line site. In this respect, the product database 140 is well-known.

According to the present invention, a product database 140 may store information in addition to that identified above. The product database 140 may additional fields representing a "prime motivator count" and a "derivatives count."

Optionally, the on-line site 100 may include a customer database 150 storing information regarding customers that may have used the on-line site in the past. Customer databases per se are known.

According to the present invention, the customer database 150 may include a field identifying subscription products for the customer. Subscription products are described herein.

Figure 2:
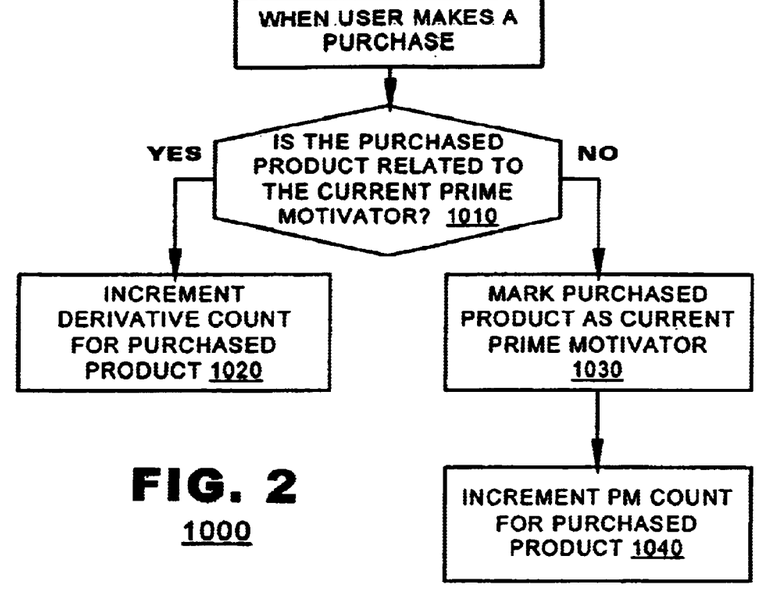
FIG. 2 is a flow diagram illustrating a method according to an embodiment of the present invention.

FIG. 2 illustrates a method 1000 operating in accordance with a first embodiment of the present invention. The method 1000 may be invoked during a shopping session each time that a customer identifies a product for purchase. In accordance with the method 1000, the method maintains in a memory an identifier of a prime motivator product. Initially, prior to a first purchase by a customer, there is no current prime motivator.

According to an embodiment of the present invention, the method 1000 may be integrated into the process used by an on-line system for handling product purchases. For example, it may be called by a larger purchasing routine executed by the on-line systems. Purchasing routines for on-line commercial systems are known per se and need not be described here. When invoked, the method 1000 determines whether the product being purchased is related to a prime motivator (Step 1010). If the purchased product and the current prime motivator are related, the purchased product is designated a derivative. Within the product database 140, a derivative count for the purchased product is incremented (Step 1020). Thereafter, the method 1000 may terminate and, if necessary, return to a larger purchasing routine for completion.

If, at Step 1010, the purchased product is not related to the current prime motivator, the purchased product itself is designated the current prime motivator (Step 1030). Within the product database 140, a prime motivator count for the purchased product is incremented (Step 1040). Thereafter, the method 1000 may terminate and, if necessary, return to a larger purchasing routine for completion.

According to a first embodiment of the present invention, two products may be identified as related if one or more of the class codes assigned to the purchased product agree with one or more of the class codes of the product represented by the current prime motivator.

Prior to a first iteration of the method 1000, the prime motivator is set to a null value. Thus, the first product purchased by the customer will cause the product to be labeled a prime motivator.

Consider the method 1000 in operation over a series of customer purchases. Using the on-line pharmacy example above, consider exemplary customer purchases of Tylenol, a thermometer and shampoo in order. When the customer purchases is Tylenol, then Tylenol is designated the prime motivator. However, because both Tylenol and the thermometer are useful in the treatment of fevers, the product database 140 may store the same class codes for both Tylenol and the thermometer. In such a case, when the customer purchases the thermometer, the class codes of Tylenol and the thermometer will match at Step 1010 and the thermometer will be considered a derivative. Tylenol will remain the current prime motivator.

In the example above, during the third iteration of the method 1000, the customer purchases shampoo. It is unlikely that Tylenol and shampoo will be assigned the same class codes in the product database 140. Thus, the method 1000 will not consider Tylenol and shampoo to be related products. The purchased shampoo will be designated as the prime motivator and its prime motivator count will be incremented. Tylenol will cease to be the prime motivator. Thus, in a successive iterations of the method 1000, the method 1000 will determine if the next-purchased product is related to shampoo.

The method 1000 thus builds a database that identifies purchasing decisions made by the consuming public. The database identifies products that represent a customer's primary motivation for "entering" the on-line "store." The database also identifies derivative products, those products whose purchase may be ancillary to the prime motivator product.

The method 1000 may be repeated for every shopping session conducted by the system 100. As the system 100 operates, it builds a database that counts the number of times that a product has been designated a prime motivator, the primary reason that the customer entered the store. The database also counts the number of time that a product has been a derivative representing the number of times that a product has been purchased ancillary to the purchase of a prime motivator product.

Advantageously, every purchase recorded by the system 100 may be recorded as either a prime motivator or as a derivative. Thus, the data collected by the system 100 is not anecdotal as would be acquired by survey evidence and does not suffer from statistical undersampling as would occur by survey evidence or customer surveillance. The method 1000 builds a database of customer behavior based on observed customer purchases and the order in which the purchases were made.

As is known, many on-line commercial systems 100 may include search functionality wherein a customer can perform a product search based on keywords or other product identifiers. According to an embodiment of the present invention, if a customer selects a product that was identified by a search result for purchase, the purchase product is designated a prime motivator, regardless of whether the class codes of a current prime motivator match the purchased product or not.

As has been described, each product may be associated with one or more product class codes. According to an embodiment of the present invention, a class code may represent fields of use for the product. The number and type of class codes used in a given application will be determined by the applications for which the system 100 will be used. For example, as is known, traditional retail establishments, such as department stores, grocery stores, pharmacies and the like, typically designate their products to one or more departments and may even designate the products to sub-groups within the department (aisles, shelves, etc.). Class codes may be assigned to products using these same organizational principles.

In an alternate embodiment, class codes may be used to represent a brand identifier associated with the product (e.g. Johnson & Johnson products, Proctor & Gamble products, etc.). In this embodiment, there may even be a class code to represent unbranded or generic products. In such an embodiment, the method 1000 may be used to determine whether brand loyalty is a motivator in purchasing decisions.

Figure 3:
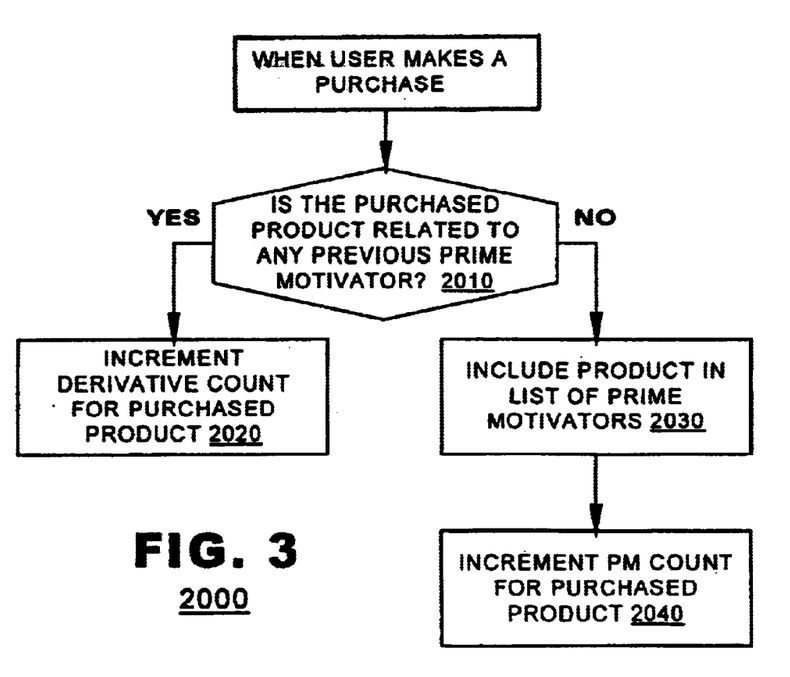
FIG. 3 is a flow diagram illustrating a method according to another embodiment of the present invention.

FIG. 3 illustrates a method 2000 according to another embodiment of the present invention. According to this second method 2000, the system 100 maintains an ever-increasing list of prime motivators during a single shopping session. Again, prior to a first iteration of the method 2000, the list of prime motivators is set to a null value. Each time a purchase is made, the method 2000 may be called. In step 2010, the method 2000 determines whether the purchased product is related to any prime motivators that may have been identified previously during the shopping session (Step 2010). If so, the purchased product may be designated as a derivative and the method 2000 may increment the derivative count for the purchased product in the product database (Step 2020). Otherwise, the list of prime motivators may be amended to include the purchased product (Step 2030). Also, the method 2000 may increment the prime motivator count for the purchased product in the product database 140 (Step 2040). At the conclusion of Step 2020 or Step 2040, the method 2000 may conclude and, if necessary, return to a larger purchasing routine for completion.

According to an embodiment of the present invention, a determination of whether a purchased product is related to a prime motivator product at Step 2010 may be performed based upon class codes as described above with respect to FIG. 2. As described above, class codes may be assigned on the basis of field of use, product brand name or other product relationships that may be identified by a proprietor of an on-line commercial system.

Figure 4:
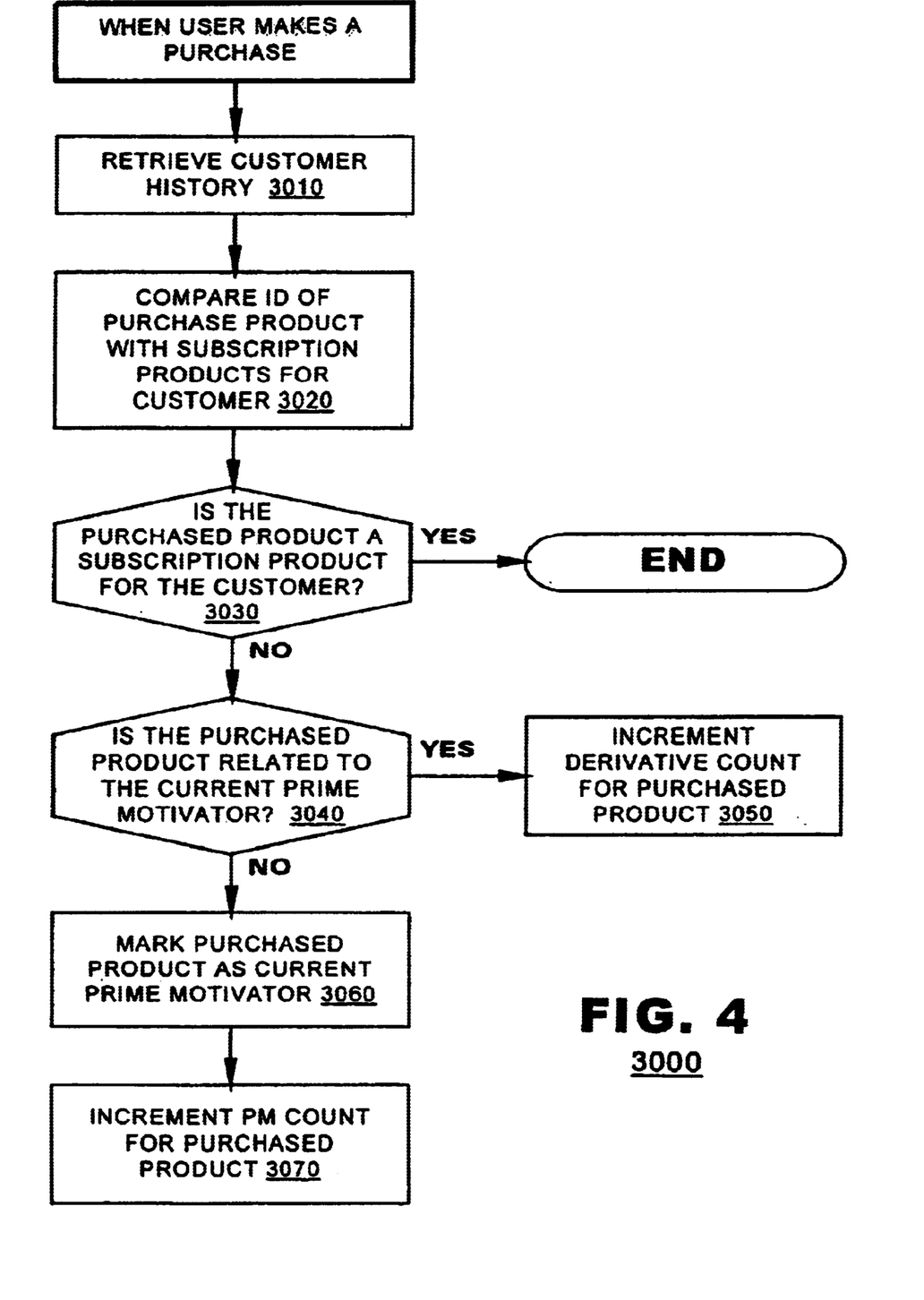
FIG. 4 is a flow diagram illustrating a method according to a further embodiment of the present invention.

FIG. 4 illustrates a method 3000 according to another embodiment of the present invention. The method 3000 may filter out certain purchases that would not reflect purchasing decisions of the public-at-large. The method may cross-reference purchasing decisions with customer profiles to determine whether a purchase has been made as part of a routine or represents other ad hoc purchasing decisions.

Herein, a "subscription product" refers to a product that is purchased by a customer as part of a purchasing routine. In the pharmaceutical example discussed above, consider aspirin as an exemplary product. Many people take aspirin daily in an effort to reduce their risk for heart attacks. It may occur in an on-line pharmacy that a customer will initiate periodic shopping sessions to replenish supplies of aspirin. In this example, for that one customer, an on-line site may identify repeated purchases of aspirin and designate aspirin as a subscription product.

The method 3000 permits the on-line system to filter subscription products out of the prime motivator counts. Again, the method 3000 may be invoked when a customer makes a purchase. The method 3000 may begin by retrieving a customer history associated with the customer (Step 3010). If, when the method is invoked, the system already possesses the customer history by virtue of some earlier act performed during the shopping session, this step may be omitted as duplicative. The method 3000 compares a product identifier of the purchased product with identifiers of subscription products that may be present in the customer history (Step 3020). The method determines whether there is a match between the product identifier of the purchased product and an identifier of subscription products in the customer history (Step 3030). If so, the method 3000 may conclude.

If not, the method determines whether the purchased product is related to a current prime motivator (Step 3040). If the purchased product and the current prime motivator are related, the purchased product is designated a derivative. Within the product database 140, a derivative count for the purchased product is incremented (Step 3050). Thereafter, the method 3000 may terminate and, if necessary, return to a larger purchasing routine for completion.

If, at Step 3010, the purchased product is not related to the current prime motivator, the purchased product itself is designated the current prime motivator (Step 3060). Within the product database 140, a prime motivator count for the purchased product is incremented (Step 3070). Thereafter, the method 3000 may terminate and, if necessary, return to a larger purchasing routine for completion.

As discussed above, operation of Steps 3040–3070 proceed in a manner that is similar to the operation of Steps 1010–1040 in FIG. 2. These steps provide for only one current prime motivator that may redesignated as determined by the purchasing decisions of a customer. Alternatively, Steps 3040–3070 may operate in accordance with the method 2000 of FIG. 3 and provide for a method that tracks multiple prime motivators.

Figure 5:
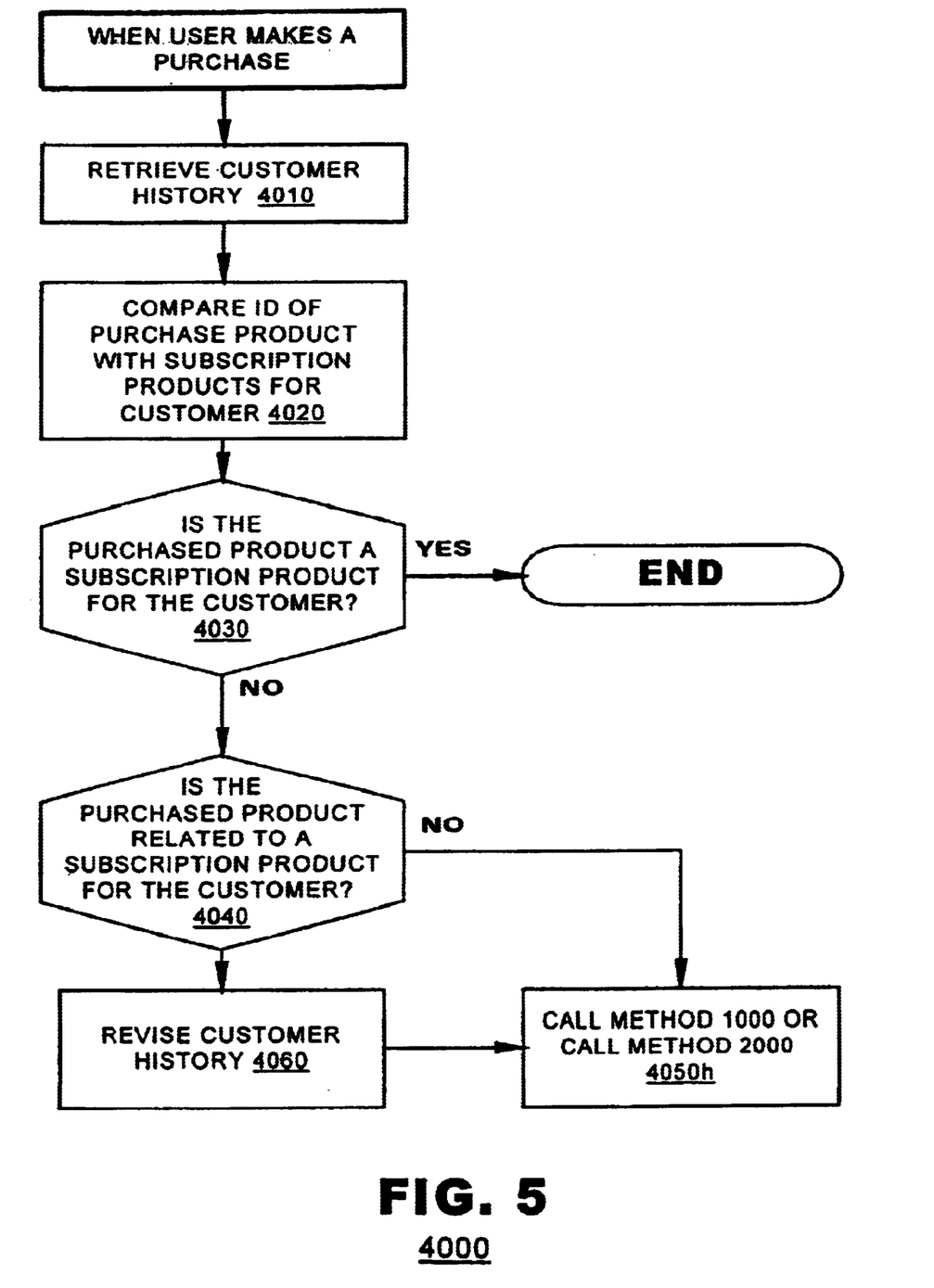
FIG. 5 is a flow diagram illustrating a method according to another embodiment of the present invention.

FIG. 5 illustrates a method 4000 constructed in accordance with a further embodiment of the present invention. The method 4000 provides the functionality of the method 3000 of FIG. 4 but with an additional optimization that permits the method to determine if a purchaser has changed decisions regarding subscription products. In the method 4000, Steps 4010–4030 proceed in a manner similar to the Steps 3010–3030 recited above with respect to the method 3000. Step 4040 is reached if a purchased product does not match any of the subscription products in the customer history. At Step 4040, the method 4000 determines whether the purchased product is related to any of the subscription products identified in the customer history. It may do so by comparing class codes of the purchased products with class codes of each of the subscription products identified in the customer history. If the purchased product is related to one of the subscription products, the method may revise the customer history of the customer to remove the one product from the list of subscription products (Step 4050). At the conclusion of Step 4050 or if no relationship is determined at Step 4040, the method may advance to one of the methods 1000 or 2000 of FIG. 2 or 3.

Figure 6:
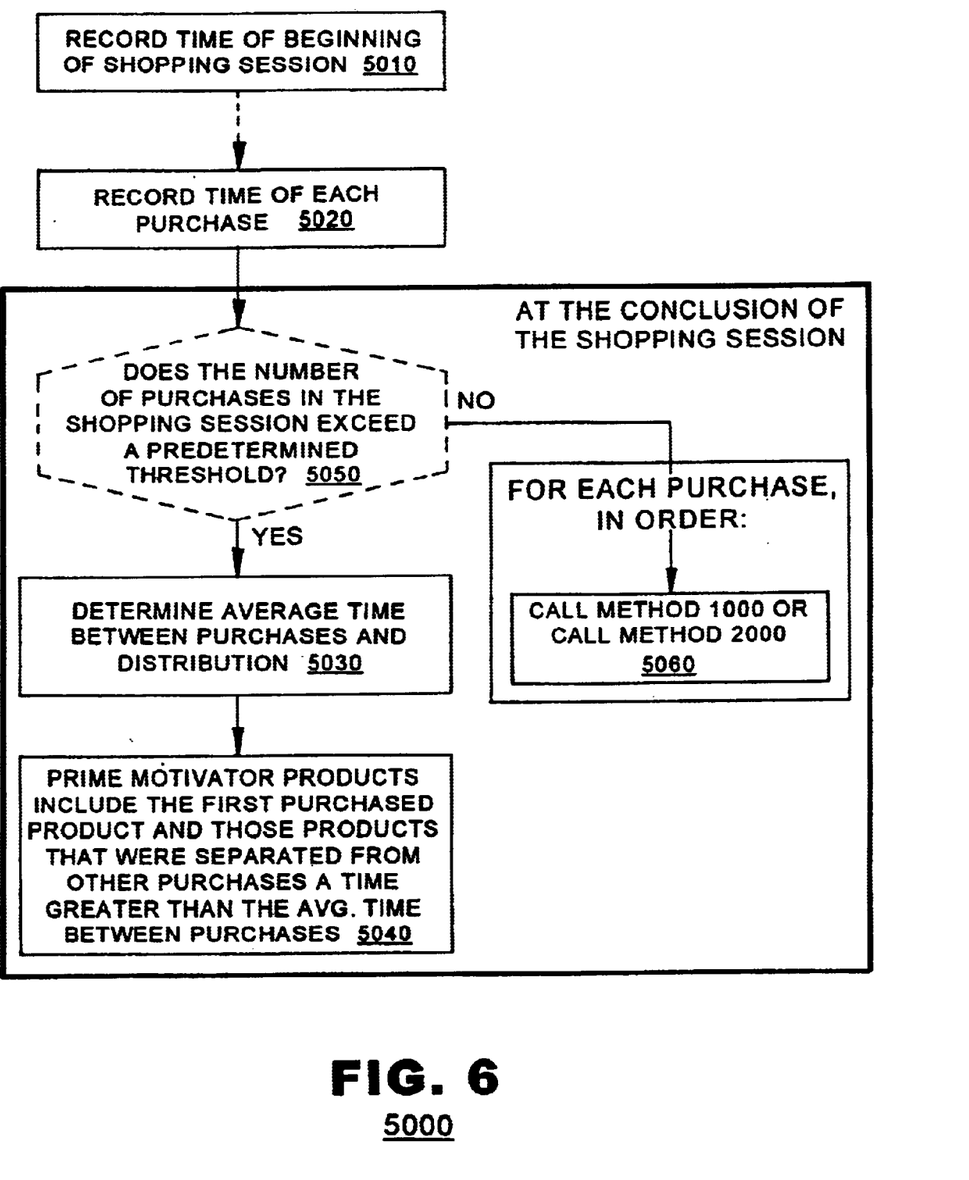
FIG. 6 is a flow diagram illustrating a method according to a further embodiment of the present invention.

FIG. 6 illustrates another method 5000 according to an embodiment of the present invention. According to method 5000, prime motivator products may be identified based upon the times between product purchases. According to the embodiment, the method 5000 records the time of the beginning of a shopping session and the time of each product purchase (Steps 5010, 5020). At the conclusion of the shopping session, for each purchased product, the method 5000 determines an incremental time of purchased measured as the time between the most recent preceding purchase (Step 5030). The first purchased product is designated a prime motivator product. Also, purchased products may be designated as prime motivator products if their associated incremental time of purchase is greater than the average time between purchases (Step 5040). All other products are designated derivative products. The method increments the prime motivator counts and derivative counts of the purchased products in the product database 140.

Consider the method 5000 in operation using the exemplary purchases illustrated below in Table 1. The table identifies seven purchases. Table 1 below records the times of purchase of each of the products and also the incremental time of purchase for each product.

As shown in the table, the average time between purchases is 1.87 minutes. Two of the seven products, shampoo and bandages, have incremental times of purchase that are greater than the average time between purchases. Accordingly, the shampoo, the bandages (and also the Tylenol) all are designated as prime motivator products under the method 5000 of FIG. 6. The remaining products are designated derivative products.

TABLE 1

| Product | Time of Purchase | Incremental Time of Purchase | Prime Motivator or Derivative? |
|---|---|---|---|
| Tylenol | 1 min. | 1 | Prime Motivator |
| Thermometer | 2 min. | 1 | Derivative |
| Shampoo | 7 min. | 5 | Prime Motivator |
| Conditioner | 8 min. | 1 | Derivative |
| Hairbrush | 9 min. | 1 | Derivative |
| Bandages | 12 min. | 3 | Prime Motivator |
| Topical Antibiotic | 13 min. | 1 | Derivative |
| Average Time Between Purchases | | | 1.86 |

The method 5000 of FIG. 6 may be optimized further to account for the standard deviation of times between product purchases. In this optimization, products may be designated prime motivators if their associated incremental times of purchase are greater than the average time between purchases plus the standard deviation of the time between purchases. In the example of Table 1, the standard deviation of the seven purchases is 1.57 minutes. Under this optimization, purchases would be designated prime motivators if the incremental time of purchase is greater that 3.43 minutes (1.86+1.57 minutes).

According to an embodiment, the method 5000 of FIG. 6 will be used when there are a sufficient number of purchased products from which useful statistical values may be derived. If, for example, a shopping session were to include only two purchases, it may be preferable to invoke a method from FIG. 1 or 2 to identify prime motivator products. Thus, the method 5000 optionally may include a step of determining whether the number of purchases exceed a predetermined threshold (Step 5050). If not, then the method may call one of the methods 1000, 2000 of FIG. 1 or 2.

Figure 7:
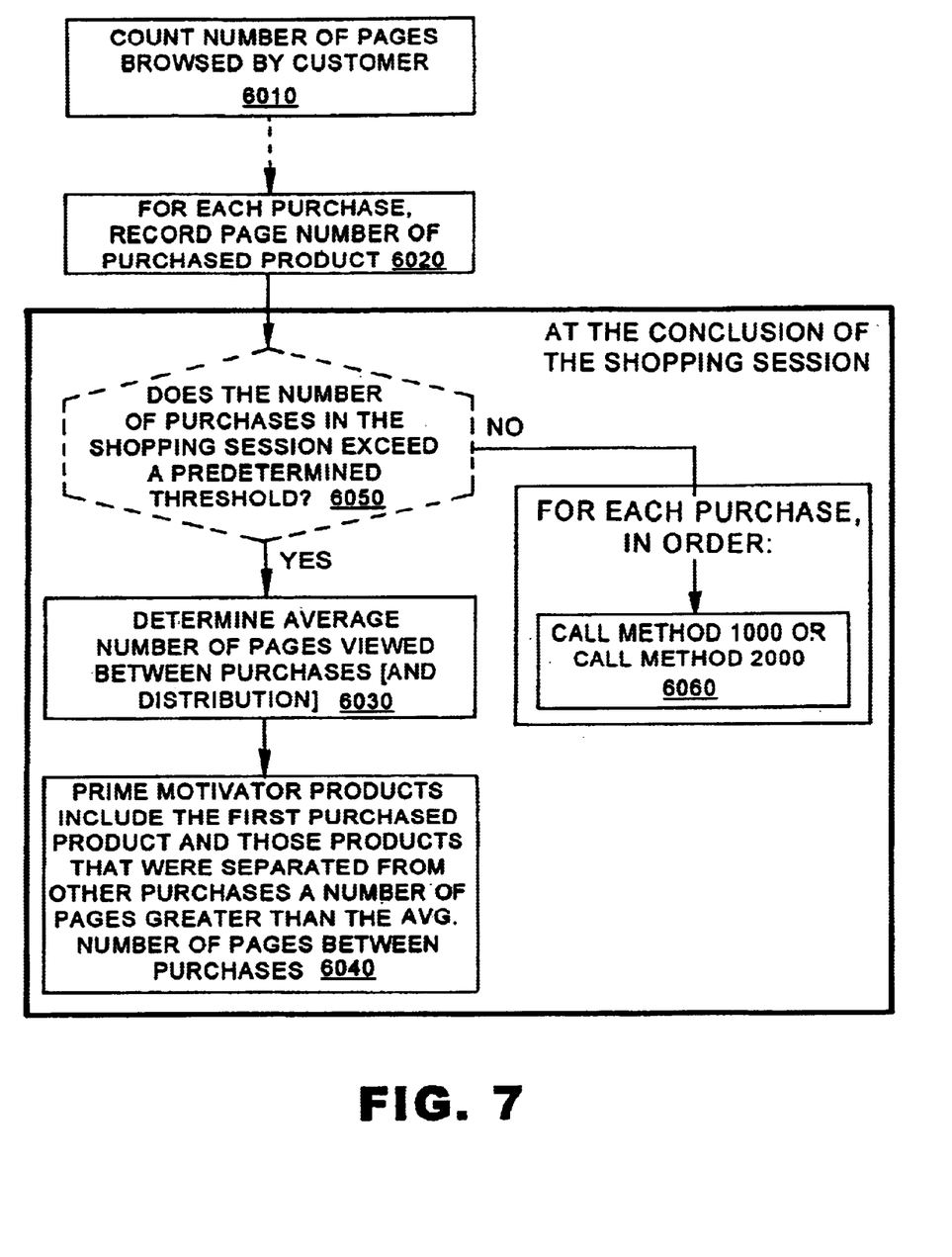
FIG. 7 is a flow diagram illustrating a method according to another embodiment of the present invention.

FIG. 7 illustrates another method 6000 according to an embodiment of the present invention. Rather than monitoring product purchases by time as in the method 5000 of FIG. 6, the method 6000 may identify prime motivator products based upon the number of pages browsed between product purchases.

As is known, many on-line commercial systems present product information to purchasers in the form of browseable web pages. The web pages may include hyperlinks or other pointers that permit customers to request still other web pages of product information (for the same product or other products) offered by the on-line site. According to the embodiment, the method 6000 counts the web pages that are presented to customers during a shopping session and, for each product purchased, records the page number from which the product was purchased. (Steps 6010, 6020). At the conclusion of the shopping session, for each purchased product, the method 6000 determines an incremental number of pages associated with the product, measured as the number of pages between the purchased product and the most recent preceding purchase (Step 6030).

The method 6000 designates the first purchased product as a prime motivator product. Also, purchased products may be designated as prime motivator products if their associated incremental number of pages is greater than the average number of pages between purchases (Step 6040). All other products are designated derivative products. The method increments the prime motivator counts and derivative counts of the purchased products in the product database 140.

The method 6000 of FIG. 7 may be optimized further to account for the standard deviation of number of pages between product purchases. In this optimization, products may be designated prime motivators if their associated incremental number of pages between purchases are greater than the average number of pages between purchases plus the standard deviation of the number of pages between purchases.

According to an embodiment, the method 6000 of FIG. 7 will be used when there are a sufficient number of purchased products from which useful statistical values may be derived. If, for example, a shopping session were to include only two purchases, it may be preferable to invoke a method from FIG. 1 or 2 to identify prime motivator products. Thus, the method 6000 optionally may include a step of determining whether the number of purchases exceed a predetermined threshold (Step 6050). If not, then the method may call one of the methods 1000, 2000 of FIG. 1 or 2 (Step 6060).

Accordingly, the present invention provides methods of identifying prime motivator products and derivative products based upon product class codes, time indices and number of pages viewed. The methods and, in particular, the class codes may be tailored for specific applications such as to identify brand loyalty among the consuming public. The present invention also may be further enhanced to filter product purchases and possibly exclude them from being considered as prime motivators or derivatives based upon customer histories.

Several embodiments of the present invention and exemplary applications are specifically illustrated and described herein. However, it will be appreciated that modifications and variations of the present invention are covered by the above teachings and within the purview of the appended claims without departing from the spirit and intended scope of the invention.

We claim:

1. A method of determining customer motivations in an on-line shopping session, comprising the steps of:

associating a respective set of class codes with each of a plurality of product records in a database; each such product record including respective product information;

retrieving product information for one or more products from the database;

forwarding the retrieved product information to a remotely-located requester;

receiving a purchase selection from the requestor for a particular product;

determining whether the purchased particular product is related to a current prime motivator product;

incrementing in the database a derivative count for the purchased particular product if the purchased particular product is determined to be related to the current prime motivator product; and if not, incrementing in the database a prime motivator count associated with the purchased particular product and labeling the purchased particular product as the current prime motivator product.

2. The method of claim 1, wherein the determining step includes a step of comparing a class code associated with the purchased particular product with a class code associated with the current prime motivator product.

3. The method of claim 2, wherein class codes of the purchased particular product and the current prime motivator product represent fields of use for these products.

4. The method of claim 2, wherein class codes of the purchased particular product and the current prime motivator product represent brands associated with these products.

5. A method of determining customer motivations in an on-line shopping session, comprising the steps of:

associating a respective set of class codes with each of a plurality of product records in a database; each such product record including respective product information;

retrieving product information for one or more products from the database;

forwarding the retrieved product information to a remotely-located requester;

receiving a purchase selection from the requestor for a particular product;

retrieving a customer history associated with the requestor;

comparing the purchased particular product to subscription products identified in the customer history;

unless the purchased particular product matches a subscription product in the customer history, determining whether the purchased particular product is related to any subscription product identified in the customer history;

if the purchased particular product is related to a subscription product identified in the customer history:
revising the customer history to remove the related subscription product form the customer history,
incrementing in the database a prime motivator count associated with the purchased particular product, and labeling the purchased particular product as the current prime motivator product.

6. The method of claim 5, wherein the determining step includes a step of comparing a class code associated with the purchased particular product with a class code associated with the subscription products.

7. The method of claim 6, wherein class codes of the purchased particular product and the subscription products represent fields of use for these products.

8. The method of claim 6, wherein class codes of the purchased particular product and the subscription products represent fields of use for these products.

9. A method of determining customer motivations in an on-line shopping session, comprising the steps of:

retrieving product information for one or more products from the database, said database including a plurality of product records having respective product information;

forwarding the retrieved product information to a remotely-located requestor;

receiving a plurality of purchase selections from the requestor for a respective particular product;

recording the time of the beginning of the on-line shopping session, recording the time of receiving each purchase selection throughout the on-line shopping session, and at the conclusion of the on-line shopping session:
determining the average time between purchase selections,
incrementing in the database a prime motivator count associated with a product of the first purchase selection,
incrementing in the database a prime motivator count associated with a product of any purchase selection having an incremental purchase time that is greater than the average time between purchase selections, and
for all other purchase selections, incrementing in the database a derivative count associated with products purchased in those purchase selections.

10. A method of determining customer motivations in an on-line shopping session, comprising the steps of:

associating a respective set of class codes with each of a plurality of product records in a database; each such product record including respective product information;

retrieving product information for one or more products from the database;

forwarding the retrieved product information to a remotely-located requester;

receiving a purchase selection from the requestor for a particular product;

determining whether the purchased particular product is related to any prior prime motivator product;

incrementing in the database a derivative count for the purchased particular product if the purchased particular product is determined to be related to any prior prime motivator product; and if not, incrementing in the database a prime motivator count associated with the purchased particular product and designating the purchased particular product as a prime motivator product.

11. A method of determining customer motivations in an on-line shopping session, comprising the steps of:

retrieving product information for one or more products from the database, said database including a plurality of product records having respective product information;

presenting the retrieved product information to a remotely-located requestor via a plurality of web pages;

receiving a plurality of purchase selections from the requestor for a respective particular product;

maintaining a count of web pages presented to the requestor, for each purchase selection received during the on-line shopping session, recording the web page count associated with the purchase selection, and at the conclusion of the on-line shopping session:

determining the average web page count between purchase selections, incrementing in the database a prime motivator count associated with a product of the first purchase selection, incrementing in the database a prime motivator count associated with a product of any other purchase selection having an incremental web page count that is greater than the average web page count, and for all other purchase selections, incrementing in the database a derivative count associated with products purchased in those purchase selections.

12. The method of claim 10, wherein the determining step includes a step of comparing a class code associated with the purchased particular product with class codes associated with each prior prime motivator product.

13. The method of claim 12, wherein class codes of the purchased particular product and prior prime motivator products represent fields of use for these products.

14. The method of claim 12, wherein class codes of the purchased particular product and prior prime motivator products represent brands associated with these products.

15. A method of determining customer motivations in an on-line shopping session, comprising the steps of:

associating a respective set of class codes with each of a plurality of product records in a database; each such product record including respective product information;

retrieving product information for one or more products from the database;

forwarding the retrieved product information to a remotely-located requestor;

receiving a purchase selection from the requestor for a particular product;

retrieving a customer history associated with the requestor;

comparing the purchased particular product to subscription products identified in the customer history;

unless the purchased particular product matches a subscription product in the customer history, determining whether the purchased particular product is related to a current prime motivator product;

incrementing in the database a derivative count for the purchased particular product if the purchased particular product is determined to be related to the current prime motivator product; and if not, incrementing in the database a prime motivator count associated with the purchased particular product and labeling the purchased particular product as the current prime motivator product.

16. The method of claim 15, wherein the determining step includes a step of comparing a class code associated with the purchased particular product with a class code associated with the current prime motivator product.

17. The method of claim 16, wherein class codes of the purchased particular product and the current prime motivator products represent brands associated with these products.

18. The method of claim 16, wherein class codes of the purchased particular product and the current prime motivator products represent fields of use for these products.

19. A method of determining customer motivations in an on-line shopping session, comprising the steps of:

associating a respective set of class codes with each of a plurality of product records in a database; each such product record including respective product information;

retrieving product information for one or more products from the database;

forwarding the retrieved product information to a remotely-located requestor;

receiving a purchase selection from the requestor for a particular product;

retrieving a customer history associated with the requestor;

comparing the purchased particular product to subscription products identified in the customer history;

unless the purchased particular product matches a subscription product in the customer history, determining whether the purchased particular product is related to any prior prime motivator product;

incrementing in the database a derivative count for the purchased particular product if the purchased particular product is determined to be related to any current prime motivator product; and if not, incrementing in the database a prime motivator count associated with the purchased particular product and labeling the purchased particular product as a prime motivator product.

20. The method of claim 19, wherein the determining step includes a step of comparing a class code associated with the purchased particular product with class codes associated with each prior prime motivator product.

21. The method of claim 20, wherein class codes of the purchased particular product and prior prime motivator products represent fields of use for these products.

22. The method of claim 20, wherein class codes of the purchased particular product and prior prime motivator products represent brands associated with these products.

* * * * *